United States Patent [19]
Iwata

[11] Patent Number: 5,764,395
[45] Date of Patent: Jun. 9, 1998

[54] INFRARED SPATIAL COMMUNICATION SYSTEM CAPABLE OF REDUCING A PROCESSING AMOUNT OF DATA COMMUNICATION DEVICES DURING COMMUNICATION

[75] Inventor: Shinichiro Iwata, Tokyo, Japan

[73] Assignee: NEC Corporation, Tokyo, Japan

[21] Appl. No.: 662,034

[22] Filed: Jun. 12, 1996

[30] Foreign Application Priority Data

Jun. 14, 1995 [JP] Japan ................................. 7-146647

[51] Int. Cl.$^6$ .................................................. H04B 10/00
[52] U.S. Cl. ........................... 359/172; 359/169; 359/143
[58] Field of Search .................................. 359/152, 172, 359/169–170, 143, 618, 627, 838

[56] References Cited

U.S. PATENT DOCUMENTS

| | | | |
|---|---|---|---|
| 4,358,858 | 11/1982 | Tamura et al. | 359/152 |
| 5,075,792 | 12/1991 | Brown et al. | 359/152 |
| 5,517,608 | 5/1996 | Suzuki et al. | 359/152 |
| 5,528,409 | 6/1996 | Cucci et al. | 359/152 |

*Primary Examiner*—Rafael Bacares
*Attorney, Agent, or Firm*—Sughrue, Mion, Zinn, Macpeak & Seas, PLLC

[57] ABSTRACT

In an infrared spatial communication system which comprises first and second data communication devices (1 and 2) and which carries out spatial communication from the first data communication device to the second data communication device by the use of an infrared ray, the second data communication device has a reflector (28) for reflecting, as a reflected infrared ray, the infrared ray which is transmitted from the first data communication device and which carries transmission data. The first data communication device has a transmitter (13, 14) for transmitting, in response to original communication data, the infrared ray which carries the original communication data as the transmission data. The second data communication device further has a receiver (25, 26) for receiving the infrared ray carrying the transmission data to produce the transmission data as primary reception data. The first data communication device further has another receiver (15, 16) for receiving the reflected infrared ray to produce, as subsidiary reception data, the transmission data carried by the reflected infrared ray. A controller (11, 12) of the first data communication device controls the transmitter so that the transmitter again transmits, when the subsidiary reception data are not coincident with the original communication data, the infrared ray which carries the original communication data. Preferably, the reflector is a hemispherical mirror.

6 Claims, 5 Drawing Sheets

INFRARED SPATIAL COMMUNICATION SYSTEM CAPABLE OF REDUCING A PROCESSING AMOUNT OF DATA COMMUNICATION DEVICES DURING COMMUNICATION

BACKGROUND OF THE INVENTION

This invention relates to an infrared spatial communication system and, in particular, to an infrared spatial communication system for carrying out spatial communication between data communication devices, such as computers, by the use of an infrared ray.

As will later be described, a conventional infrared spatial communication system uses a handshaking method so that data communication can be carried out between data communication devices with a high reliability. However, when one of the data communication devices receives an infrared ray carrying transmission data from another of the data communication devices to produce the transmission data as reception data, the above-mentioned one of the data communication devices should transmit back to the other of the data communication devices either the reception data or error information detected from the reception data.

This results in an increase of a processing amount of the above-mentioned one of the data communication devices during communication.

SUMMARY OF THE INVENTION

It is therefore an object of this invention to provide an infrared spatial communication system which is capable of carrying out spatial communication with an improved reliability without transmitting back reception data and error information of the reception data from one of data communication devices to another of the data communication devices.

It is another object of this invention to provide an infrared spatial communication system of the type described, which is capable of reducing a processing amount of the above-mentioned one of the data communication devices during communication.

Other objects of this invention will become clear as the description proceeds.

On describing the gist of this invention, it is possible to understand that an infrared spatial communication system comprises first and second data communication devices and carries out spatial communication between the first and the second data communication devices by the use of an infrared ray.

According to this invention, the first data communication device comprises in the above-understood infrared spatial communication system: a transmitter (13 and 14) for transmitting, in response to original communication data, the infrared ray which carries the original communication data as transmission data. The second data communication device comprises: a receiver (25, 26) for receiving the infrared ray carrying the transmission data to produce the transmission data as primary reception data; and a reflector (28) for reflecting, as a reflected infrared ray, the infrared ray carrying the transmission data. The first data communication device further comprises: another receiver (15, 16) for receiving the reflected infrared ray to produce, as subsidiary reception data, the transmission data carried by the reflected infrared ray; and a controller (11, 12) for controlling the transmitter so that the transmitter again transmits, when the subsidiary reception data are not coincident with the original communication data, the infrared ray which carries the original communication data.

DESCRIPTION OF THE PREFERRED EMBODIMENTS

Figure 1:
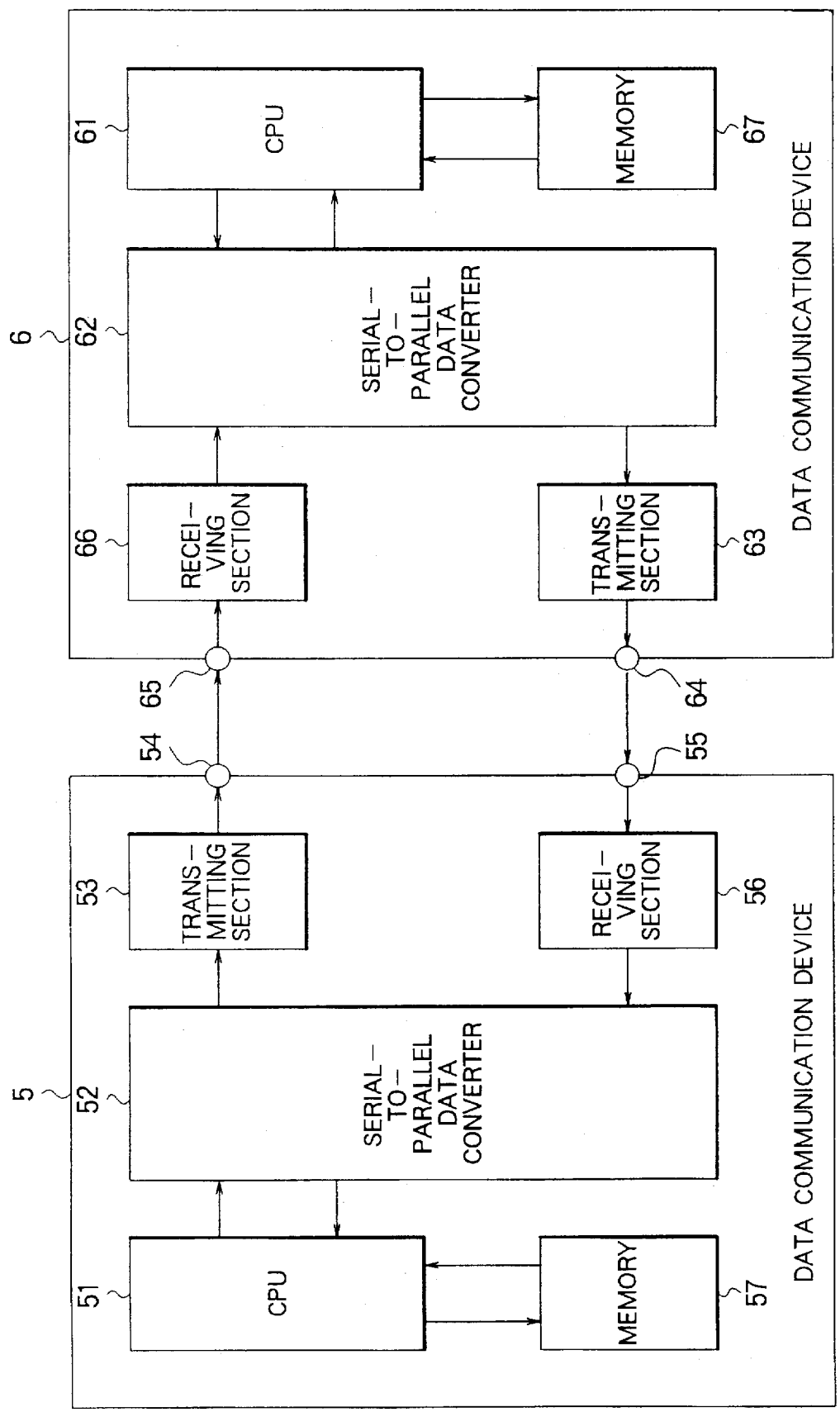
FIG. 1 is a block diagram of a conventional infrared spatial communication system.

Referring to FIG. 1, a conventional infrared spatial communication system will be described for a better understanding of this invention. The infrared spatial communication system is substantially equivalent to the infrared spatial communication system which is briefly described in the preamble of the instant specification. The infrared spatial communication system carries out data communication between data communication devices 5 and 6 by the use of an infrared ray. When the data communication is carried out from the data communication device 5 to the data communication device 6, a light emitting element 54 of the data communication device 5 emits the infrared ray. A photodetector element 65 of the data communication device 6 receives the infrared ray.

The data communication devices 5 and 6 comprise CPUs (central processing units) 51 and 61, serial-to-parallel data converters (hereinafter simply referred to as data converters) 52 and 62, transmitting sections 53 and 63, light emitting elements (for example, light emitting diodes) 54 and 64, photodetector elements (for example, photodiodes) 55 and 65, receiving sections 56 and 66, and memories 57 and 67, respectively.

When transmission is carried out in the data communication device 5, the: CPU 51 reads original communication data from the memory 57. The original communication data thus read are parallel data. The data converter 52 converts the parallel data into serial data of the original communication data.

In response to the serial data of the original communication data, the transmitting section 53 switches the light emitting element 54 so as to carry out an on-off control of the light emitting element 54 which emits the infrared ray. In this manner, the light emitting element 54 emits the infrared ray which carries the original communication data as transmission data to thereby carry out serial transmission of the original communication data to the data communication device 6.

Thus, a combination of the transmitting section 53 and the light emitting element 54 is operable as a transmitter which transmits, in response to the original communication data, the infrared ray which carries the original communication data as the transmission data.

When reception is carried out in the data communication device 6, the photodetector element 65 receives the infrared ray from the light emitting element 54 of the data communication device 5. Then, the receiving section 66 converts an output signal of the photodetector element 65 into the transmission data (serial data) which are delivered to the data converter 62 as primary reception data.

Thus, a combination of the photodetector element 65 and the receiving section 66 is operable as a receiver which receives the infrared ray carrying the transmission data and produces the transmission data as the primary reception data.

The data converter 62 converts the serial data of the primary reception data into parallel data of the primary reception data. The CPU 61 receives the parallel data of the primary reception data and stores the parallel data of the primary reception data in the memory 67.

In the infrared spatial communication system, a handshaking method is used in order to carry out the data communication with an improved reliability. According to the handshaking method, the primary reception data produced by the receiver (the photodetector element 65 and the receiving section 66) of the data communication device 6 are sent back to the data communication device 5. For this purpose, the CPU 61 delivers the parallel data of the primary reception data to the data converter 62 to make the data converter 62 convert the parallel data of the primary reception data into the serial data of the primary reception data. Another transmitter constituted by a combination of the transmitting section 63 and the light emitting element 64 transmits back to the data communication device 5 the infrared ray which carries the serial data of the primary reception data.

In the data communication device 5, another receiver constituted by a combination of the photodetector element 55 and the receiving section 56 receives the infrared ray and produces the serial data of the primary reception data. The data converter 52 converts the serial data of the primary reception data into the parallel data of the primary reception data which are delivered to the CPU 51. The CPU 51 compares the parallel data of the primary reception data with the parallel data of the original communication data and makes the transmitter (the transmitting section 53 and the light emitting element 54) again transmit the infrared ray carrying the original communication data when the parallel data of the primary reception data are not coincident with the parallel data of the original communication data.

By the use of the above-mentioned handshaking method, detection and recovery can be carried out either upon interruption of a communication path during communication or upon occurrence of data errors due to any reason.

In the above-mentioned conventional infrared spatial communication system using the handshaking method, the communication can be carried out with a high reliability. However, the primary reception data or error information detected from the primary reception data must be transmitted from a receiving data communication device to a transmitting data communication device.

In the data communication using the infrared ray, each light emitting element consumes a large current. As a result, every time when the data communication is carried out, each of the receiving data communication device and the transmitting data communication device consumes a large current. Particularly in the infrared data communication between portable communication apparatuses, a transmission time must be as short as possible in view of the battery life. Accordingly, it is difficult to apply the infrared spatial communication system using the handshaking method to such portable communication apparatuses.

In addition, the receiving data communication device not only receives the transmission data but also transmits the primary reception data or the error information detected from the primary reception data to the transmitting data communication device. This results in an increase of a processing amount of the receiving data communication device during the communication. Thus, the receiving data communication device suffers a heavy load.

On the other hand, the receiving data communication device intended for reception alone inevitably requires the transmitter for transmitting to the transmitting data communication device the primary reception data or the error information detected from the primary reception data. This results in a complicated structure of the receiving data communication device.

In order to solve the above-mentioned problems, this invention provides an infrared spatial communication system which is capable of carrying out communication with an improved reliability without sending back the primary reception data or error information thereof from the receiving data communication device to the transmitting data communication device and which is capable of achieving extension of the battery life and reduction of the processing amount of the receiving data communication device during the communication.

Figure 2:
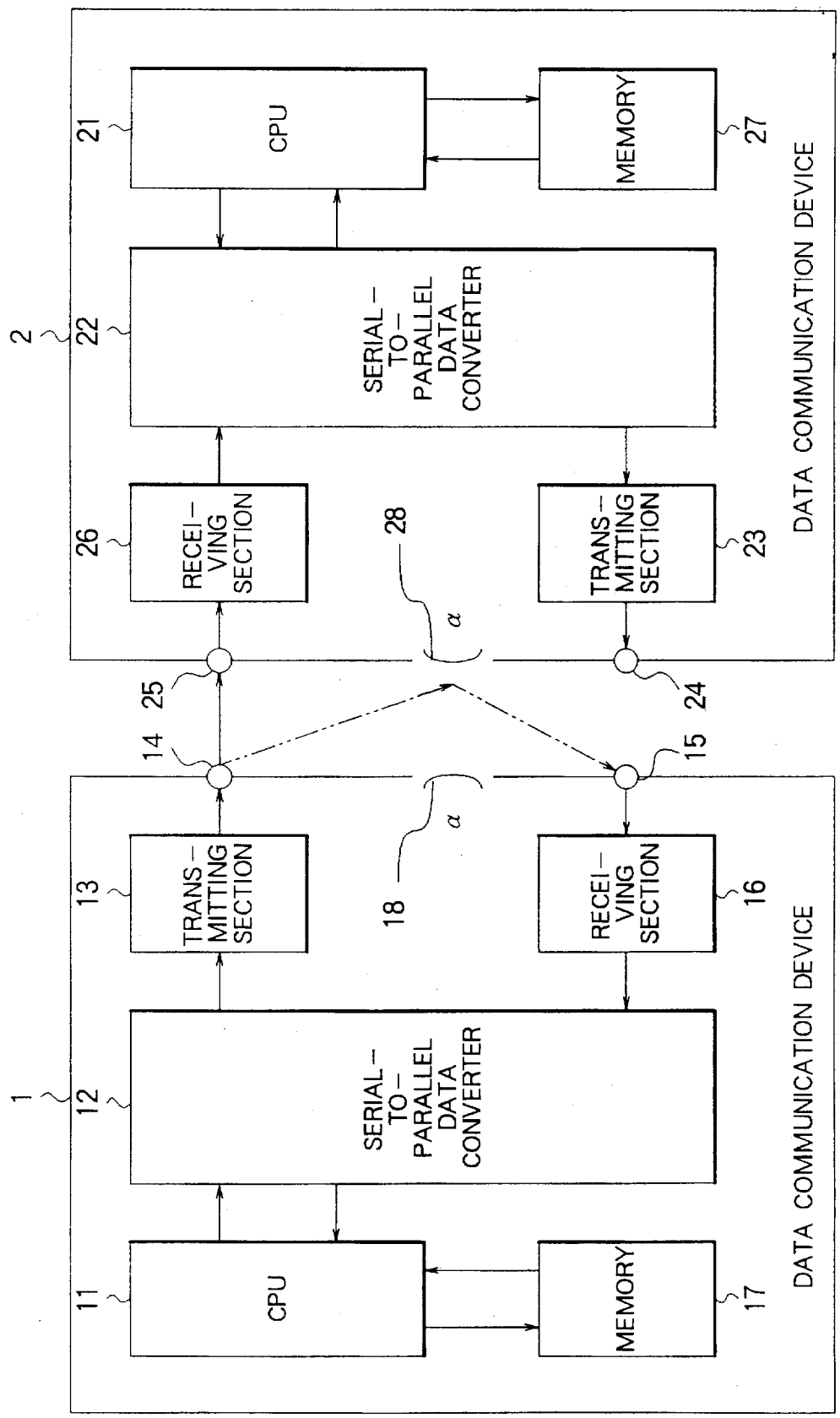
FIG. 2 is a block diagram of an infrared spatial communication system according to a first embodiment of this invention.

Turning to FIG. 2, an infrared spatial communication system according to a first embodiment of this invention carries out data communication between data communication devices 1 and 2 by the use of an infrared ray.

The data communication devices 1 and 2 comprise CPUs (central processing units) 11 and 21, serial-to-parallel data converters (hereinafter simply referred to as data converters) 12 and 22, transmitting sections 13 and 23, light emitting elements (for example, light emitting diodes) 14 and 24, photodetector elements (for example, photodiodes) 15 and 25, receiving sections 16 and 26, memories 17 and 27, and hemispherical mirrors 18 and 28, respectively.

The hemispherical mirrors 18 and 28 are located in the vicinity of the photodetector elements 15 and 25, respectively, and serve as reflectors which reflect the infrared ray from a counterpart data communication device so as to send the infrared ray back to the counterpart data communication device. The hemispherical mirror 18 (or 28) has a solid angle a equal to a communicable angle determined by a radiation angle of the light emitting element 24 (or 14).

When transmission is carried out in the data communication device 1, the CPU 11 reads first original communication data from the memory 17. The first original communication data thus read are parallel data. The data converter 12 converts the parallel data into serial data of the first original communication data.

In response to the serial data of the first original communication data, the transmitting section 13 switches the light emitting element 14 so as to carry out an on-off control of the light emitting element 14 which emits the infrared ray. In this manner, the light emitting element 14 emits the infrared ray which carries the first original communication data as first transmission data to thereby carry out serial transmission of the first original communication data to the data communication device 2.

Thus, a combination of the transmitting section 13 and the light emitting element 14 is operable as a transmitter which transmits, in response to the first original communication data, the infrared ray which carries the first original communication data as the first transmission data.

When reception is carried out in the data communication device 2, the photodetector element 25 receives the infrared ray from the light emitting element 14 of the data communication device 1. Then, the receiving section 26 converts an output signal of the photodetector element 25 into the first transmission data (serial data) which is delivered to the data converter 22 as first primary reception data.

Thus, a combination of the photodetector element 25 and the receiving section 26 is operable as a receiver which receives the infrared ray carrying the first transmission data and produces the first transmission data as the first primary reception data.

The data converter 22 converts the serial data of the first primary reception data into parallel data of the first primary reception data. The CPU 21 receives the parallel data of the first primary reception data and stores the parallel data of the first primary reception data in the memory 27.

The hemispherical mirror 28 serves as a reflector which reflects, as a first reflected infrared ray, the infrared ray carrying the first transmission data.

In the data communication device 1, the photodetector element 15 receives the first reflected infrared ray from the hemispherical mirror 28 of the data communication device 2. The receiving section 16 converts an output signal of the photodetector element 15 into the first transmission data (serial data) which are carried by the first reflected infrared ray and which are delivered to the data converter 12 as first subsidiary reception data.

Thus, a combination of the photodetector element 15 and the receiving section 16 is operable as another receiver which receives the first reflected infrared ray and produces, as the first subsidiary reception data, the first transmission data carried by the reflected infrared ray.

The data converter 12 converts the serial data of the first subsidiary reception data into parallel data of the first subsidiary reception data which are delivered to the CPU 11. The CPU 11 compares the parallel data of the first subsidiary reception data with the parallel data of the first original communication data and makes the transmitter (the transmitting section 13 and the light emitting element 14) again transmit the infrared ray carrying the first original communication data when the parallel data of the first subsidiary reception data are not coincident with the parallel data of the first original communication data.

Thus, a combination of the data converter 12 and the CPU 11 serves as a controller which is connected to the transmitter (13 and 14) and the receiver (15 and 16). The controller controls the transmitter (13 and 14) so that the transmitter (13 and 14) again transmits, when the first subsidiary reception data are not coincident with the first original communication data, the infrared ray which carries the first original communication data.

When transmission is carried out in the data communication device 2, the CPU 21 reads second original communication data (parallel data) from the memory 27. The data converter 12 converts the parallel data into serial data of the second original communication data.

A combination of the transmitting section 23 and the light emitting element 24 serves as another transmitter which transmits, in response to the second original communication data (serial data), the infrared ray which carries the second original communication data as second transmission data.

When reception is carried out in the data communication device 1, the receiver (the photodetector element 15 and the receiving section 16) receives the infrared ray carrying the second transmission data and produces the second transmission data as second primary reception data.

The data converter 12 converts the second primary reception data (serial data) into parallel data of the second primary reception data. The CPU 11 stores the parallel data of the second primary reception data in the memory 17.

The hemispherical mirror 18 of the data communication device 1 serves as another reflector which reflects, as a second reflected infrared ray, the infrared ray which carries the second transmission data and which is transmitted by the transmitter (the transmitting section 23 and the light emitting element 24) of the data communication device 2.

The receiver (the photodetector element 25 and the receiving section 26) of the data communication device 2 receives the second reflected infrared ray from the hemispherical mirror 18 and produces, as second subsidiary reception data, the second transmission data carried by the second reflected infrared ray.

In the data communication device 2, a combination of the data converter 22 and the CPU 21 serves as anther controller which is connected to the transmitter (23 and 24) and the receiver (25 and 26). The controller controls the transmitter (23 and 24) so that the transmitter (23 and 24) again transmits, when the second subsidiary reception data are not coincident with the second original communication data, the infrared ray which carries the second original communication data.

Figure 3:
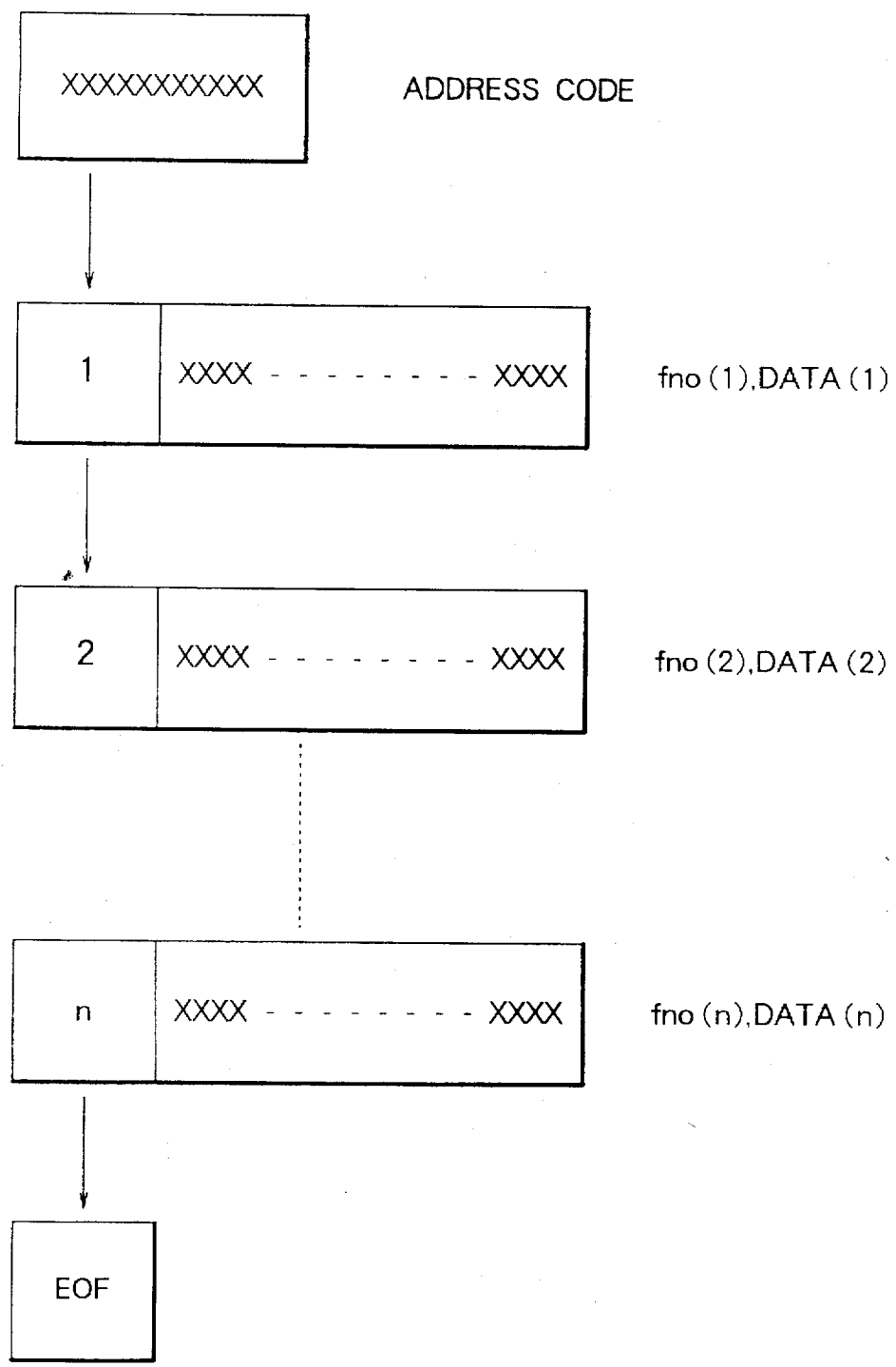
FIG. 3 is a view for use in describing a structure of frames of original communication data used in the infrared spatial communication system illustrated in FIG. 2.

Turning to FIG. 3 with reference to FIG. 2 continued, description will proceed to a structure of frames of the original communication data. It will be assumed that the illustrated original communication data are the first original communication data which are transmitted from the data communication device 1 to the data communication device 2. In this event, the original communication data are transmitted with the original, communication data carried on the infrared ray in a form of a plurality of frames.

The original communication data include an address code "XXXXXXXXXXX" representative of an identification code assigned to the data communication device 2, a plurality of transmission data "XXXX . . . XXX" associated with frame numbers "1" to "n", and an EOF (End Of Frame) code. The frame numbers "1" to "n" indicates the order of the communication data. The address code "XXXXXXXXXXX", the transmission data "XXXX . . . XXX", and the EOF code are successively transmitted in a form of the frames.

Figure 4:
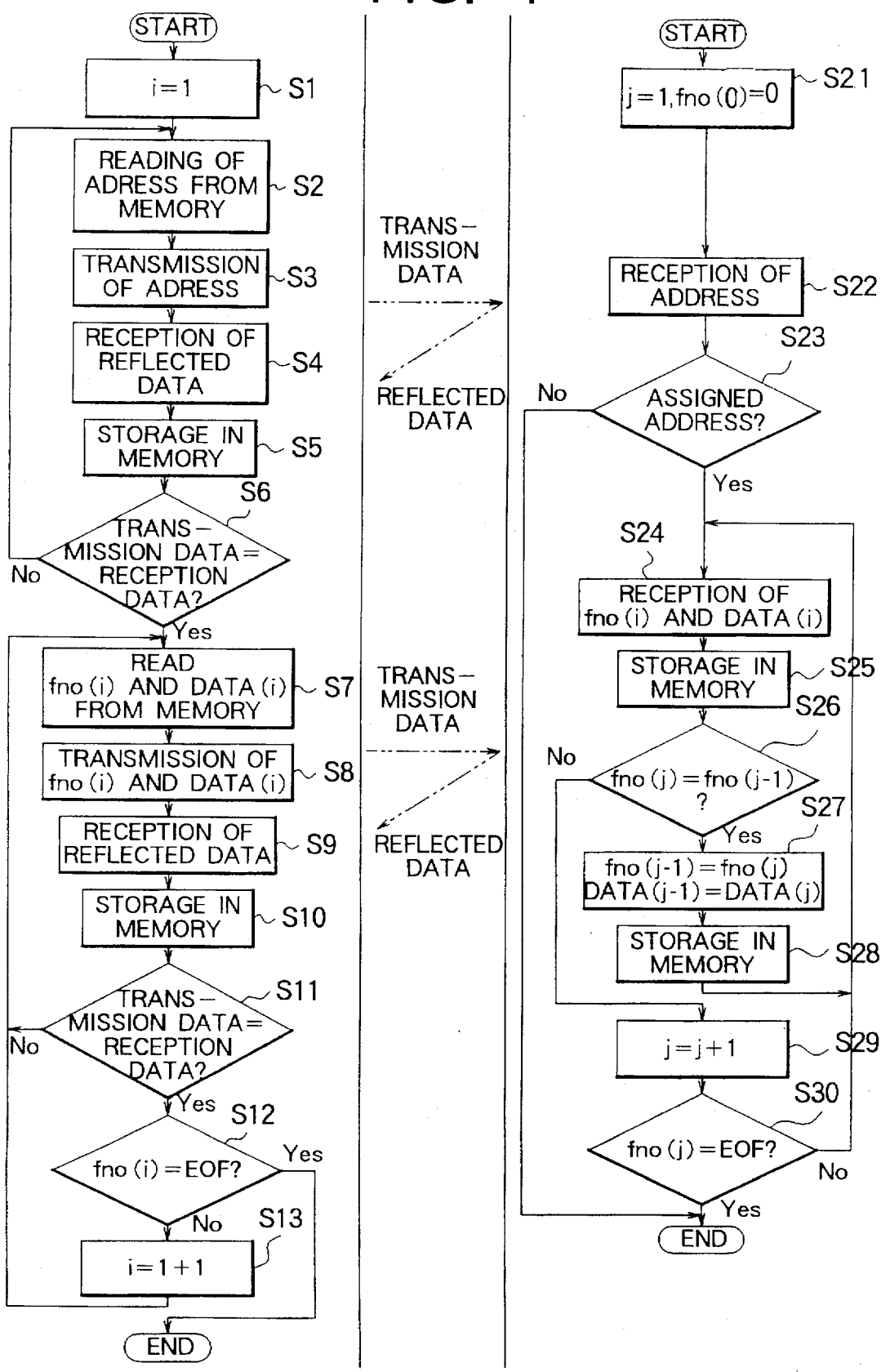
FIG. 4 is a flow chart for use in describing operation of the infrared spatial communication system illustrated in FIG. 2.

Turning to FIG. 4 with reference to FIGS. 2 and 3, description will be made as regards a transmitting operation of the original communication data from the data communication device 1 to the data communication device 2.

At first, when the transmitting operation is started in the data communication device 1, initialization (i=1) of the transmitting operation is carried out (step S1 in FIG. 4). Thereafter, the address code of the counterpart data communication device 2 is read from the memory 17 (step S2 in FIG. 4). The address code is transmitted to the data communication device 2 (step S3 in FIG. 4).

In this event, the address code read from the memory 17 is converted by the data converter 12 into the serial data. In response to the address code converted by the data converter 12 into the serial data, the transmitting section 13 switches the light emitting element 14 to thereby carry out serial transmission to the data communication device 2.

The address code transmitted from the data communication device 1 is reflected by the hemispherical mirror 28 of the data communication device 2 to be sent back to the data communication device 1. When the photodetector element 15 of the data communication device, 1 receives the infrared ray as reflected by the hemispherical mirror 28, the receiving section 16 converts the infrared ray received by the photodetector element 15 into the serial data for delivery to the data converter 12 (step S4 in FIG. 4).

The data converter 12 converts the serial data from the receiving section 16 into the parallel data to be delivered to the CPU 11. Thus, the CPU 11 receives as the parallel data the address code as reflected by the hemispherical mirror 28 and stores the address code in the memory 17 (step S5 in FIG. 4).

The CPU 11 compares the address code transmitted to the reception device 2 and the address code as reflected by the hemispherical mirror 28 (step S6 in FIG. 4). Upon detection of incoincidence therebetween, the same address code is retransmitted to the data communication device 2.

Upon coincidence between the address code transmitted to the data communication device 2 and the address code as reflected by the hemispherical mirror 28, the CPU 11 reads the frame number fno(1) and the communication data DATA (1) of the first frame from the memory 17 (step S7 in FIG. 4) and transmits the frame number fno(1) and the transmission data DATA(1) of the first frame to the data communication device 2 (step S8 in FIG. 4).

In this case also, the frame number fno(1) and the transmission data DATA(1) of the first frame read from the memory 17 are converted by the data converter 12 into the serial data. In response to the frame number fno(1) and the transmission data DATA(1) of the first frame after converted by the data converter 12 into the serial data, the transmitting section 13 switches the light emitting element 14 to thereby carry out serial transmission to the data communication device 2.

The frame number fno(1) and the transmission data DATA(1) of the first frame transmitted from the data communication device 1 are reflected by the hemispherical mirror 28 of the data communication device 2 to be sent back to the data communication device 1. When the photodetector element 15 of the data communication device 1 receives the infrared ray as reflected by the hemispherical mirror 28, the receiving section 16 converts the infrared ray as received by the photodetector element 15 into the serial data for delivery to the data converter 12 (step S9 in FIG. 4).

The data converter 12 converts the serial data from the receiving section 16 into the parallel data to be delivered to the CPU 11. Thus, the CPU 11 receives as the parallel data the frame number fno(1) and the transmission data DATA(1) of the first frame as reflected by the hemispherical mirror 28 and stores the frame number fno(1) and the transmission data DATA(1) of the first frame in the memory 17 (step S10 in FIG. 4).

The CPU 11 compares the frame number fno(1) and the transmission data DATA(1) of the first frame transmitted to the reception device 2 and the frame number fno(1) and the transmission data DATA(1) of the first frame as reflected by the hemispherical mirror 28 (step S11 in FIG. 4). Upon detection of incoincidence therebetween, the frame number fno(1) and the transmission data DATA(1) of the first frame are retransmitted to the data communication device 2.

When the frame number fno(1) and the transmission data DATA(1) of the first frame transmitted to the data communication device 2 are coincident with the frame number fno(1) and the transmission data DATA(1) of the first frame as reflected by the hemispherical mirror 28, the CPU 11 reads the frame number fno(2) and the transmission data DATA(2) of the second frame subsequent thereto (steps S13 and S7 in FIG. 4) and transmits the frame number fno(2) and the transmission data DATA(2) of the second frame to the reception device 2 (step S8 in FIG. 4).

The data communication device 1 repeatedly carries out the above-mentioned frame transmitting operation (steps S7 through S13 in FIG. 4) until the frame labelled EOF is transmitted to the data communication device 2 (step S12 in FIG. 4).

On the other hand, when a receiving operation is started in the data communication device 2, initialization [j=1, fno(0)=0] of the receiving operation is carried out (step S21 in FIG. 4). Thereafter, the address code supplied from the counterpart data communication device 1 is received (step S22 in FIG. 4).

In the data communication device 2, the photodetector element 25 receives the infrared ray emitted from the light emitting element 14 of the data communication device 1. The receiving section 26 converts the infrared ray received by the photodetector element 25 into the serial data for delivery to the data converter 22.

The data converter 22 converts the serial data supplied from the receiving section 26 into the parallel data to be delivered to the CPU 21. Thus, the CPU 21 receives as the parallel data the address code transmitted from the data communication device 1.

The CPU 21 judges whether or not the address code supplied from the data communication device 1 is coincident with a specific address preliminarily assigned to the data communication device 2, in other words, whether or not the data following the address code are directed to the data communication device 2 (step S23 in FIG. 4).

Unless the address code from the data communication device 1 is coincident with the specific address, the CPU 21 immediately stops the receiving operation.

When the address code supplied from the data communication device 1 is coincident with the specific address, the CPU 21 receives the frame number fno(j) and the transmission data DATA(j) subsequently delivered from the data communication device 1 (step S24 in FIG. 4).

In the data communication device 2, the photodetector element 25 receives the infrared ray supplied from the light emitting element 54 of the data communication device 5, the receiving section 26 converts the infrared ray received by the photodetector element 25 into the serial data for delivery to the data converter 22.

The data converter 22 converts the serial data supplied from the receiving section 26 into the parallel data to be delivered to the CPU 21. Thus, the CPU 21 receives the transmission data from the data communication device 1 as the reception data in the form of the parallel data and stores the reception data in the memory 27 (step S25 in FIG. 4).

Thereafter, the CPU 21 compares the frame number fno(j) currently received and the frame number fno(j-1) previously received (step S26 in FIG. 4). Upon detection of incoincidence therebetween, it is judged that a previous reception frame is correct data. The receiving operation of the next frame number fno(j) and the transmission data DATA(j) is started (steps S29 and S24 in FIG. 4).

Unless the incoincidence therebetween is detected, the CPU 21 judges that the previous reception frame is incorrect. The previous reception frame is replaced by a current reception frame (step S27 in FIG. 4). The current reception data are stored in the memory 27 (step S28 in FIG. 4).

The data communication device 2 repeatedly carries out the above-mentioned frame receiving operation (steps S24 to S30 in FIG. 4) until the frame labelled EOF is transmitted from the data communication device 1 (step S30 in FIG. 4).

As described above, without transmitting the reception data from the data communication device 2 to the data communication device 1, the data communication device 1 can detect whether or not the data communication device 2 correctly receives the data. In response to the result of detection, the retransmitting operation is carried out. It is thus possible to achieve the infrared spatial communication with an improved reliability without sending back the reception data or the error information thereof from the data communication device 2 to the data communication device 1.

Figure 5:
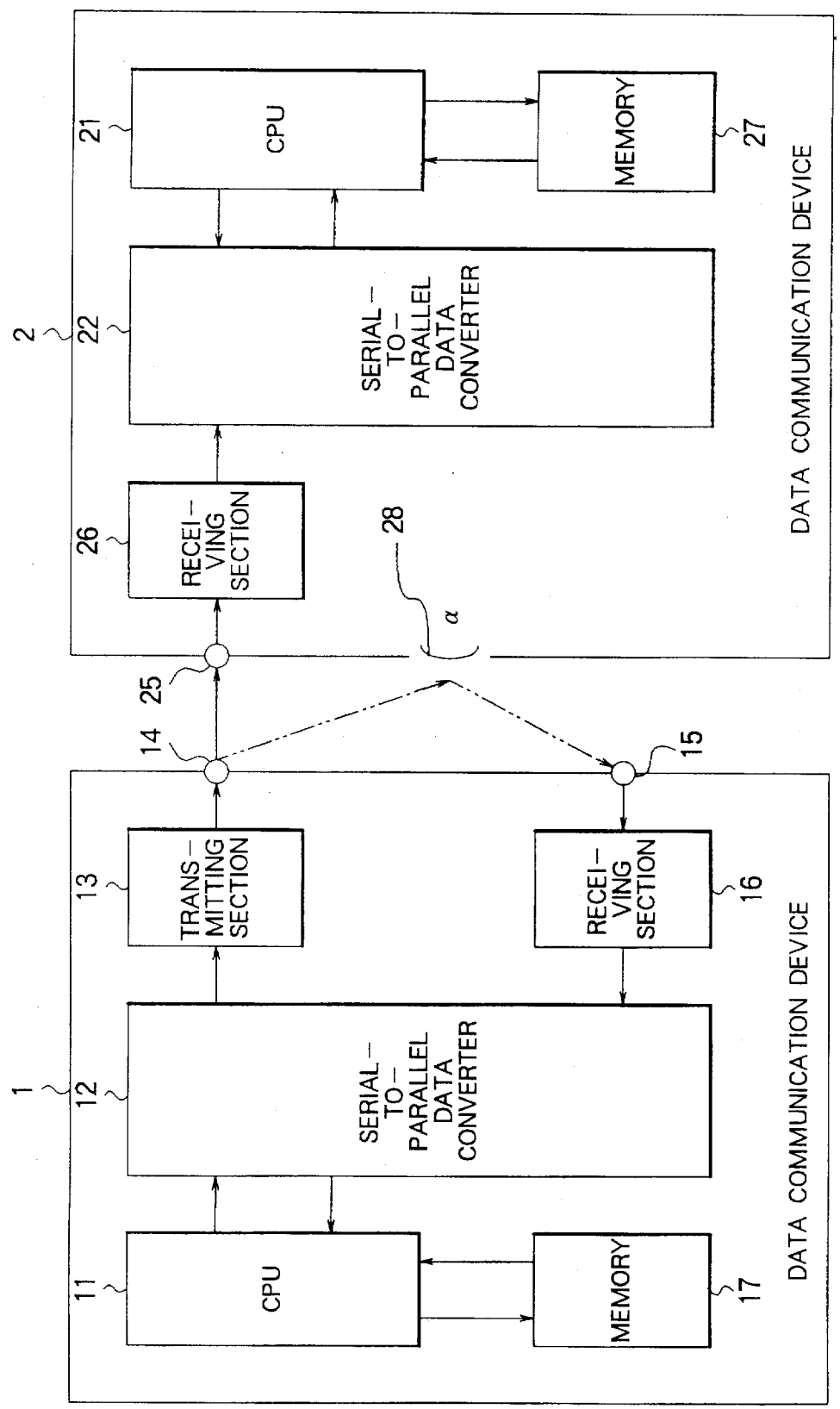
FIG. 5 is a block diagram of an infrared spatial communication system according to a second embodiment of this invention.

Turning to FIG. 5, an infrared spatial communication system according to a second embodiment of this invention comprises similar parts designated by like reference numerals. The infrared spatial communication system illustrated in FIG. 5 is similar to the infrared spatial communication system of FIG. 2 except that the data communication device 2 has only a receiving function of the infrared ray.

With the data communication devices 1 and 2, the data communication is carried out in a single direction from the data communication device 1 to the data communication device 2. The transmitting operation of the data communication device 1 and the receiving operation of the data communication device 2 are similar to those described in conjunction with the abovementioned first embodiment of this invention and therefore will not be described any longer. According to the second embodiment of this invention, the infrared spatial communication can be achieved with an improved reliability in the manner similar to that of the first embodiment of this invention.

According to each of the first and the second embodiments of this invention, data communication is achieved with an improved reliability without transmitting back either the primary reception data or.error information of the primary reception data from a receiving data communication device 2 to a transmitting data communication device 1.

In that event, the receiving data communication device 2 need not operate the transmitter (23 and 24) which consume a large electric power. It is therefore possible to achieve extension of the battery life of the portable communication apparatuses and reduction of the processing amount during communication.

In the receiving data communication device 2 intended to perform reception alone in the infrared spatial communication, no transmitter is required to send back the primary reception data or the error information thereof to the transmitting data communication device 1. Thus, the structure of the receiving data communication device 2 can be simplified. The cost of the receiving data communication device 2 can be reduced.

What is claimed is:

1. An infrared spatial communication system for providing spatial communication of data between devices by the use of an infrared ray, said communication system comprising:

a first data communication device (1) and a second data communication device (2);

said first dat communication device comprising:

a first data communication transmitter (13, 14) for transmitting, in response to origional communication data, an infrared ray which carries said origional communication data as transmission data;

said second data communication device comprising:

a second data communication receiver (25, 26) for receiving said infrared ray from said first data communication device and producing primary reception data; and a reflector (28) for reflecting said infrared ray transmitted from said first data communication device and producing a reflected infrared ray directed only to said first data communication device;

said first data communication device further comprising:

a first data communication receiver (15, 16) for receiving said reflected infrared ray and for producing subsidiary reception data; and a first data communication controller (11, 12) for controlling said first data communication transmitter to retransmit said infrared ray carrying said original communication data when said subsidiary reception data are not coincident with said original communication data.

2. An infrared spatial communication system as claimed in claim 1, wherein said reflector is a hemispherical mirror.

3. An infrared spatial communication system for providing spatial communication between data communication devices by the use of an infrared ray, said infrared spatial communication system comprising:

a first data communication device (1) comprising:
a transmitter (13, 14) for transmitting original communication data as transmission data via an infrared ray;
a first receiver (15, 16); and
a controller (11, 12);

a second data communication device (2) comprising:
a second receiver (25, 26) for receiving said infrared ray carrying said transmission data and for producing said transmission data as primary reception data; and
a reflector (28) for reflecting said infrared ray carrying said transmission data and directing said reflected infrared ray only to said first data communication device;

the first receiver of said first data communication device receiving said reflected infrared ray and producing subsidiary reception data, and the controller of said first data communication device being connected to said transmitter and said first receiver for controlling said transmitter to retransmit said infrared ray carrying said original communication data when said subsidiary reception data are not coincident with said original communication data.

4. An infrared spatial communication system as claimed in claim 3, wherein said reflector is a hemispherical mirror.

5. An infrared spatial communication system for providing spatial communication between data communication devices by the use of an infrared ray, said infrared spatial communication system comprising:

a first data communication device comprising:
a first transmitter (13, 14) for transmitting an infrared ray which carries first original communication data as first transmission data;
a first receiver (15, 16);
a first controller (11, 12); and
a first reflector (18);

a second data communication device comprising:
a second receiver (25, 26) for receiving the infrared ray carrying said first transmission data and for producing first primary reception data; and
a second reflector (28) for reflecting the infrared ray carrying said first transmission data and producing a first reflected infrared ray directed only to said first data communication device;

the first receiver of said first data communication device receiving said first reflected infrared ray and producing first subsidiary reception data, the first controller of said first data communication device being connected to said first transmitter and said first receiver for controlling said first transmitter to retransmit said infrared ray containing said first original communication data when said first subsidiary reception data are not coincident with said first original communication data;

said second data communication device further comprising:

a second transmitter (23, 24) for transmitting an infrared ray which carries second original communication data as second transmission data; and a second controller (21, 22);

said first receiver of said first data communication device receiving the infrared ray carrying said second transmission data and producing second primary reception data;

said first reflector of said first data communication device reflecting the infrared ray carrying said second transmission data and producing a second reflected infrared ray directed only to said second data communication device;

said second receiver of said second data communication device receiving said second reflected infrared ray and producing second subsidiary reception data;

said second controller of said second data communication device being connected to said second transmitter and said second receiver for controlling said second transmitter to retransmit said infrared ray which carries said second original communication data when said second subsidiary reception data are not coincident with said second original communication data.

6. An infrared spatial communication system as claimed in claim 5, wherein each of said first and said second reflectors is a hemispherical mirror.

* * * * *